(12) United States Patent
Yu et al.

(10) Patent No.: US 7,327,797 B2
(45) Date of Patent: Feb. 5, 2008

(54) ORTHOGONAL FREQUENCY DIVISION MULTIPLEXING (OFDM) RECEIVING DEVICE FOR FORMING BEAM WITH UNEVEN WIDTH BY CHANNEL PROPERTY, COMMUNICATION DEVICE USING THE SAME, AND METHOD THEREOF

(76) Inventors: Bong-Wee Yu, c/o Samsung Electronics Co., Ltd. 416, Maetan-dong, Paldal-gu, Suwon-City, Kyungki-do (KR); Hyun-Cheol Park, c/o Samsung Electronics Co., Ltd. 416, Maetan-dong, Paldal-gu, Suwon-City, Kyungki-do (KR); Dong-Kyu Kim, c/o Samsung Electronics Co., Ltd. 416, Maetan-dong, Paldal-gu, Suwon-City, Kyungki-do (KR); Jun-Hyun Park, c/o Samsung Electronics Co., Ltd. 416, Maetan-dong, Paldal-gu, Suwon-City, Kyungki-do (KR); Ju-Yon Kim, c/o Samsung Electronics Co., Ltd. 416, Maetan-dong, Paldal-gu, Suwon-City, Kyungki-do (KR); Hak-Lim Ko, c/o Samsung Electronics Co., Ltd. 416, Maetan-dong, Paldal-gu, Suwon-City, Kyungki-do (KR)

( * ) Notice: Subject to any disclaimer, the term of this patent is extended or adjusted under 35 U.S.C. 154(b) by 1156 days.

(21) Appl. No.: 09/985,123

(22) Filed: Nov. 1, 2001

(65) Prior Publication Data

US 2002/0106042 A1    Aug. 8, 2002

(30) Foreign Application Priority Data

Feb. 8, 2001    (KR) ................................ 2001-6248

(51) Int. Cl.
*H04B 7/02* (2006.01)
*H04L 1/02* (2006.01)

(52) U.S. Cl. ...................................... 375/267; 375/347

(58) Field of Classification Search ................ 375/141, 375/146, 147, 267, 286, 219, 260, 347; 367/138; 342/343, 367, 371, 174; 455/272, 132, 135, 455/303
See application file for complete search history.

(56) References Cited

U.S. PATENT DOCUMENTS 5,373,533 A * 12/1994 Hayashihara et al. ........ 375/334

(Continued)

FOREIGN PATENT DOCUMENTS

EP    0 949 769 A1    10/1999

(Continued)

*Primary Examiner*—Betsy L. Deppe
(74) *Attorney, Agent, or Firm*—Sughrue Mion, PLLC

(57) ABSTRACT

An OFDM receiving device for adjusting a beam formation azimuth through a plurality of antennas, a communication device using the same, and a method thereof. The OFDM communication device having a plurality of individually-aligned antennas includes a receiving signal generating unit for decoding and restoring OFDM signals from the plurality of antennas, a beam coefficient calculating unit for calculating channel property information inclusive of a signal to noise rate, from the signal received from the receiving signal generating unit, and calculating a beam coefficient of an antenna, for forming a beam in a configuration that optimizes reception sensitivity, from the channel property information, a receiving beam processing unit for outputting the signals from the antennas to the receiving signal generating unit, and controlling the corresponding antenna to form a beam in a configuration corresponding to the beam coefficient received from the beam coefficient calculating unit, a transmitting signal generating unit for modulating a transmission-intended signal into a transmitting signal, and a transmission beam processing unit for controlling the antenna according to the beam coefficient from the beam coefficient calculating unit in order to transmit the transmitting signal through the antenna.

18 Claims, 6 Drawing Sheets

U.S. PATENT DOCUMENTS

| | | | |
|---|---|---|---|
| 5,856,804 A * | 1/1999 | Turcotte et al. | 342/371 |
| 6,006,110 A * | 12/1999 | Raleigh | 455/561 |
| 6,009,124 A * | 12/1999 | Smith et al. | 375/267 |
| 6,072,998 A * | 6/2000 | Kaku | 455/234.2 |
| 6,128,276 A | 10/2000 | Agee | |
| 6,351,499 B1 * | 2/2002 | Paulraj et al. | 375/267 |
| 6,421,005 B1 * | 7/2002 | Weaver et al. | 342/367 |
| 6,490,448 B1 * | 12/2002 | Hogberg et al. | 455/427 |
| 6,492,942 B1 * | 12/2002 | Kezys | 342/368 |
| 6,584,302 B1 * | 6/2003 | Hottinen et al. | 455/69 |
| 6,795,424 B1 * | 9/2004 | Kapoor et al. | 370/343 |
| 6,831,943 B1 * | 12/2004 | Dabak et al. | 375/147 |

FOREIGN PATENT DOCUMENTS

| | | |
|---|---|---|
| JP | 11-298345 A | 10/1999 |
| WO | WO 99/55012 A2 | 10/1999 |

\* cited by examiner

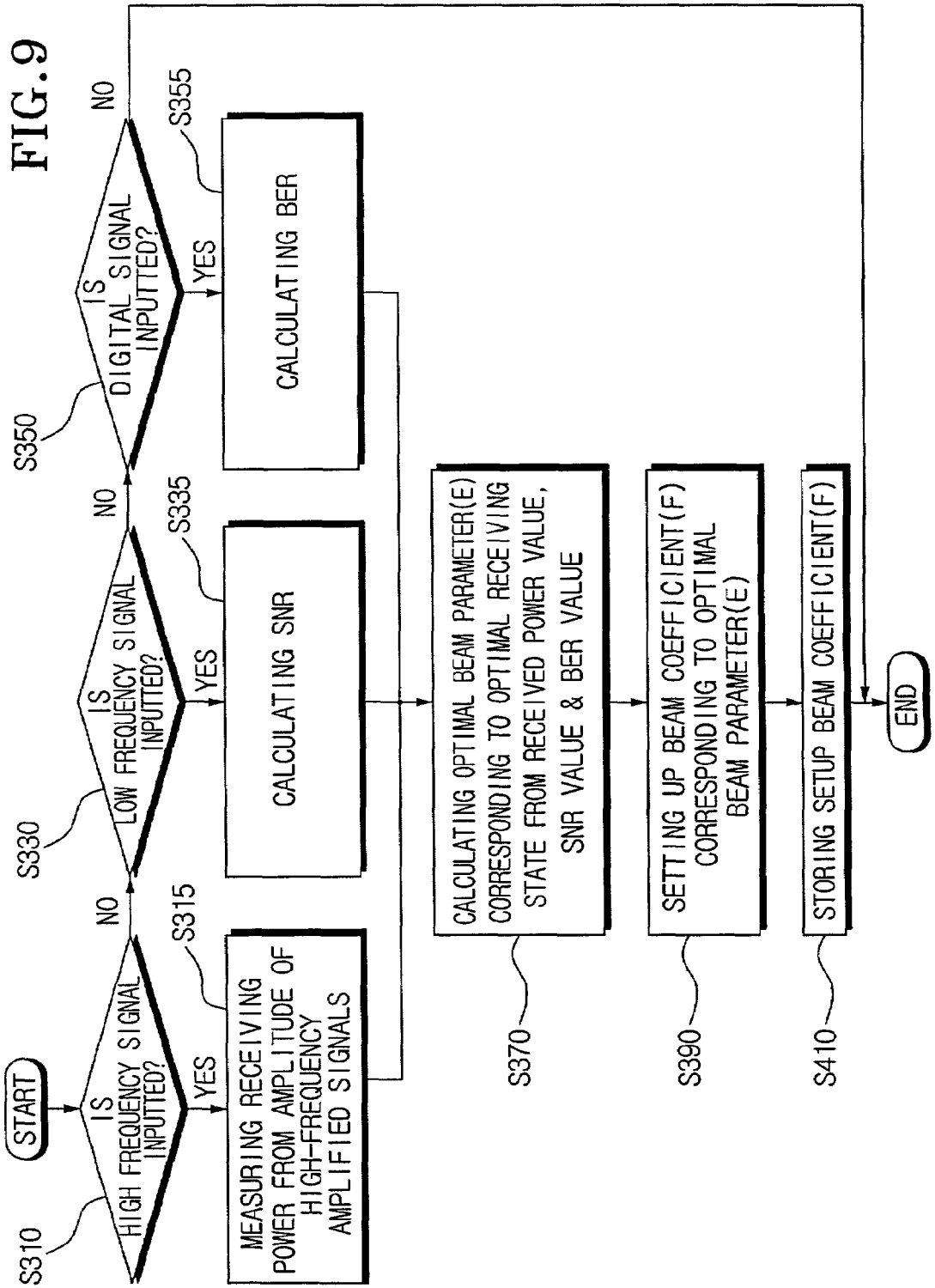

ORTHOGONAL FREQUENCY DIVISION MULTIPLEXING (OFDM) RECEIVING DEVICE FOR FORMING BEAM WITH UNEVEN WIDTH BY CHANNEL PROPERTY, COMMUNICATION DEVICE USING THE SAME, AND METHOD THEREOF

BACKGROUND OF THE INVENTION

1. Field of the Invention

The present invention relates to an OFDM receiving device, a communication device using the same, and a method thereof, and in particular to an improved OFDM receiving device for adjusting a beam formation azimuth through a plurality of antennas, a communication device using the same, and a method thereof. The present application is based on Korean Patent Application No. 2001-6248 filed on Feb. 8, 2001, which is incorporated herein by reference.

2. Description of the Related Art

An orthogonal frequency division multiplexing (OFDM) signal is obtained by transforming serially-input data into parallel data according to a time axis, and Fourier-transforming the resultant data.

The OFDM signal is used for a new digital broadcasting system such as a digital audio broadcasting (DAB) system and a digital video broadcasting (DVB) system replacing a general analog broadcasting medium such as a radio and TV.

In general, in the OFDM communication, signals are transmitted/received by using OFDM modulation and space time block coding and decoding (Codec). A plurality of antennas is provided in OFDM transmission/reception terminals to transmit/receive the modulated signals.

Here, the space time block coding codes transmission-intended signals into a specific signal configuration before the Fourier transformation, so that the signals can be simultaneously transmitted in parallel through the plurality of antennas.

An OFDM communication device using the space time block Codec performs the OFDM communication through predetermined transmission channel patterns of the respective antennas. In addition, the plurality of antennas form beams having different azimuth and identical magnitude and width, respectively. Therefore, the beams of the antennas are crossed to extend a reception range region on the space, so that an occupied region of the space can be increased by beam formation regions of the antennas, namely a non-occupied region of the space can be minimized.

Accordingly, the general OFDM communication device has a disadvantage in that it cannot precisely receive a signal outside the reception region decided by the beam formation regions of the antennas, namely the coverage region.

In addition, in the actual receiving environment, the receiving signal may be distorted from an original signal due to variations of the transmission channel on the air.

When the plurality of beams are homogeneously formed without considering distortion of the receiving signal, such as a signal to noise rate and a bit to error rate, many communication devices are required, including antennas, resulting in increased power consumption.

SUMMARY OF THE INVENTION

Accordingly, it is a primary object of the present invention to provide an OFDM receiving device which can adjust a beam configuration of antennas in a direction of high reception sensitivity, by judging a transmission channel property from a receiving signal.

Another object of the present invention is to provide an OFDM communication device which can form a beam corresponding to a beam configuration of low distortion rate by judging distortion of a receiving signal, and which can transmit a signal through the beam configuration, and a method using the same.

In order to achieve the above-described object of the present invention, there is provided an OFDM receiving device for forming a beam with uneven width according to a channel property, including: a receiving signal generating unit for decoding and restoring OFDM signals from a plurality of antennas; a beam coefficient calculating unit for calculating channel property information inclusive of a signal to noise rate from the signal received from the receiving signal generating unit, and calculating a beam coefficient for an antenna, for forming a beam in a configuration that optimizes reception sensitivity from the channel property information; and a receiving beam processing unit for outputting the signals from the antennas to the receiving signal generating unit, and controlling the corresponding antenna to form a beam in a configuration corresponding to the beam coefficient received from the beam coefficient calculating unit.

In order to achieve another object of the present invention, there is provided an OFDM communication device for forming a beam with uneven width according to a channel property, including a receiving signal generating unit for decoding and restoring OFDM signals from a plurality of antennas; a beam coefficient calculating unit for calculating channel property information inclusive of a signal to noise rate from the signal received from the receiving signal generating unit, and calculating a beam coefficient of an antenna for forming a beam in a configuration that optimizes reception sensitivity from the channel property information; a receiving beam processing unit for outputting the signals from the antennas to the receiving signal generating unit, and controlling the corresponding antenna to form a beam in a configuration corresponding to the beam coefficient from the beam coefficient calculating unit; a transmitting signal generating unit for modulating a transmission-intended signal into a transmitting signal; and a transmitting beam processing unit for controlling the antenna according to the beam coefficient calculated by the beam coefficient calculating unit, in order to transmit the transmitting signal through the antenna.

In addition, there is provided an OFDM communication method for forming a beam with uneven width according to a channel property, including the steps of determining whether signals are received from each antenna; calculating channel property information from the received signals, and calculating a beam coefficient corresponding to an antenna beam configuration for improving communication performance, from the channel property information, when the signals are received from the antennas; and adjusting a beam formation azimuth of the antennas to form a beam corresponding to the calculated beam coefficient.

In accordance with the present invention, the beam configuration of the antenna can be flexibly changed by calculating the beam coefficient from the detected signal during the decoding of the receiving signal, thereby improving accuracy of the receiving signal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 9 is a flowchart showing a beam coefficient calculating process in FIG. 8.

DETAILED DESCRIPTION OF THE PREFERRED EMBODIMENT

An OFDM receiving device for forming a beam with uneven width according to a channel property, a communication device using the same and a method thereof will now be described with reference to the accompanying drawings.

Figure 1:
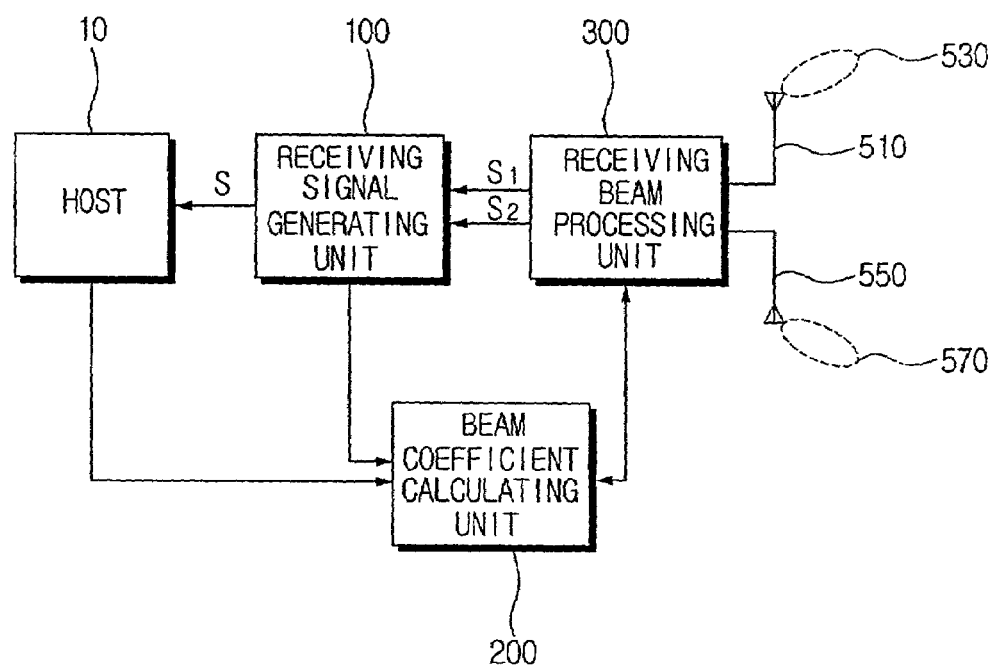
FIG. 1 is a block diagram illustrating an OFDM receiving device in accordance with the present invention.

FIG. 1 is a block diagram illustrating the OFDM receiving device in accordance with a preferred embodiment of the present invention.

Referring to FIG. 1, the OFDM receiving device includes a receiving signal generating unit 100, a beam coefficient calculating unit 200, a receiving beam processing unit 300 and a plurality of antennas 510, 550. Reference numeral 10 denotes a host.

The host 10 is connected to the receiving signal generating unit 100, for processing the signal from the OFDM receiving device through a display device (not shown) or an audio device (not shown). Exemplary hosts include a digital TV, a digital audio receiver and a digital frequency modulation receiver.

Here, the OFDM receiving device may be applied to the host 10 in a built-in or armored type.

Preferably, each of the plurality of antennas 510, 550 is aligned separately from one another in order to prevent interference.

The receiving signal generating unit 100 decodes the received signal into readable data of the host 10. Here, the host 10 measures load information of a beam corresponding to the density of the receiving signal through the readable data, and outputs the load information to the beam coefficient calculating unit 200. In addition, the receiving signal generating unit 100 provides information for calculating a beam coefficient to the beam coefficient calculating unit 200 along with the information generated during the decoding process.

The beam coefficient calculating unit 200 calculates a beam coefficient F corresponding to beam configurations 530, 570 to be formed on the antennas 510, 550 according to the information from the receiving signal generating unit 100. At this time, the beam coefficient F implies a value corresponding to the different beam formation regions 530, 570 of the antennas 510, 550. That is, the beam coefficient F implies antenna control information deciding the preferred beam configurations 530, 570 of the antennas 510, 550, namely a range, magnitude and width of the beam.

The receiving beam processing unit 300 controls the antennas 510, 550 to maintain the beam configurations 530, 570 according to the beam coefficient F from the beam coefficient calculating unit 200. In addition, the receiving beam processing unit 300 outputs signals input through the antennas 510, 550 to the receiving signal generating unit 100 according to the beam configurations 530, 570 of the antennas 510, 550.

Preferably, control signals applied to the antennas 510, 550 for forming the preferred beam configurations do not interrupt external input signals of the antennas 510, 550. In addition, the control signals corresponding respectively to the various beam configurations of the antennas 510, 550 can be experimentally obtained considering the antennas 510, 550.

Figure 2:
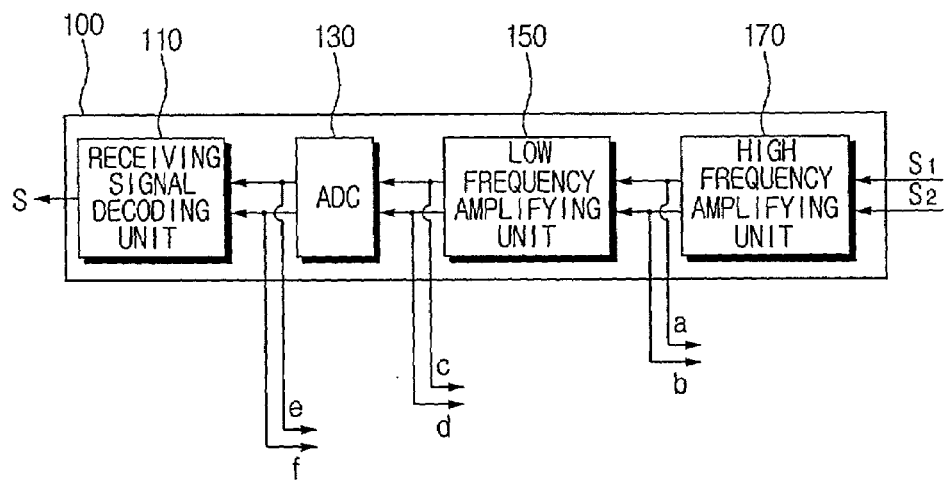
FIG. 2 is a block diagram illustrating a receiving signal generating unit in FIG. 1.

FIG. 2 is a block diagram illustrating the receiving signal generating unit 100 in FIG. 1. As shown therein, the receiving signal generating unit 100 includes a receiving signal decoding unit 110, an analog-digital converting unit 130, a low frequency amplifying unit 150, and a high frequency amplifying unit 170.

The receiving beam processing unit 300 outputs the input signals from the antennas 510, 550 to the receiving signal generating unit 100 without transformation.

The signals S1, S2 output from the receiving beam processing unit 300 denote the signals received from the air through the respective antennas 510, 550.

The high frequency amplifying unit 170 high-frequency amplifies the signals S1, S2 from the receiving beam processing unit 300, and outputs the amplified signals a, b to the low frequency amplifying unit 150 and the beam coefficient calculating unit 200.

The low frequency amplifying unit 150 detects low frequency signals from the high-frequency amplified signals a, b through filtering, and low-frequency amplifies the detected signals. Thereafter, the low frequency amplifying unit 150 outputs the amplified signals c, d to the analog-digital converting unit 130 and the beam coefficient calculating unit 200.

The analog-digital converting unit 130 converts the low-frequency amplified analog signals c, d into digital signals, and outputs the resultant digital signals e, f to the receiving signal decoding unit 110 and the beam coefficient calculating unit 200.

The receiving signal decoding unit 110 decodes the digital signals e, f, selects an efficient signal from the signals S1, S2 corresponding to the original signals according to the decoding result, and outputs the selected signal S to the host 10.

The host 10 processes the input signal S through a display device (not shown) or an audio device (not shown). In addition, the host 10 obtains the load information of the beam of the antenna from the input signal S, and outputs the load information to the beam coefficient calculating unit 200.

As described above, the signals a, b, c, d, e, f from the respective blocks of the receiving signal generating unit 100 are used to calculate the beam coefficient for receiving the signal in the beam coefficient calculating unit 200. Here, the beam coefficient calculating unit 200 may calculate the beam coefficient by using at least one signal selected respectively from the high-frequency amplified signals a, b, the low-frequency amplified signals c, d and the digital signals e, f.

Figure 3:
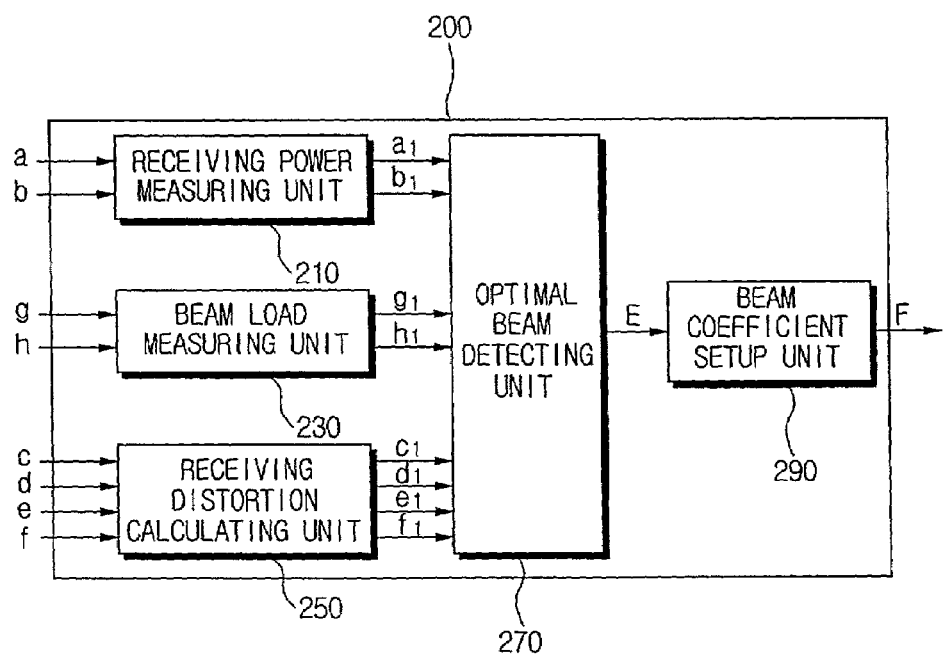
FIG. 3 is a block diagram illustrating a beam coefficient calculating unit in FIG. 1.

FIG. 3 is a block diagram illustrating the beam coefficient calculating unit 200 in FIG. 1. As shown therein, the beam coefficient calculating unit 200 includes a receiving power measuring unit 210, a beam load measuring unit 230, a receiving distortion calculating unit 250, an optimal beam detecting unit 270, and a receiving beam coefficient setup unit 290.

The receiving power measuring unit 210 measures a receiving power corresponding to amplitudes of the input signals a, b from the high frequency amplifying unit 170, and outputs the measured values a1, b1 to the optimal beam detecting unit 270.

The beam load measuring unit 230 measures beam load information corresponding to density of the input signals g, h from the host 10 according to the beam configurations 530, 570 of the antennas 510, 550, and outputs the measured values g1, h1 to the optimal beam detecting unit 270.

The receiving distortion calculating unit 250 receives the signals c, d from the low frequency amplifying unit 150 or the signals e, f from the analog-digital converting unit 130, calculates distortion rates from the original signals, and outputs the calculated values c1, d1, e1, f1 to the optimal beam detecting unit 270.

Figure 4:
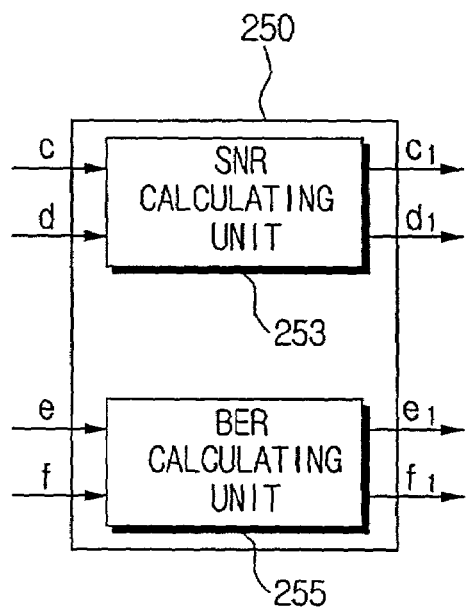
FIG. 4 is a block diagram illustrating a receiving distortion calculating unit in FIG. 3.

FIG. 4 is a block diagram illustrating the receiving distortion calculating unit 250 in FIG. 3. Referring to FIG. 4, the receiving distortion calculating unit 250 includes a signal to noise rate (SNR) calculating unit 253 and a bit to error rate (BER) calculating unit 255.

The SNR calculating unit 253 detects a noise power accompanying the signal power from the amplitudes of the signals c, d from the low frequency amplifying unit 150, and calculates S/N values c1, d1 from the noise power.

The BER calculating unit 255 detects an error bit number from the whole bit number of the signals e, f from the analog-digital converting unit 130, and calculates BER values e1, f1 of the signals e, f. Here, the bit values may be calculated by receiving the BER values from the receiving signal decoding unit 110. In addition, the BER may be obtained from a resultant value for inserting a pilot symbol of a predetermined shape to find out channel information of a receiving signal in a frame of the OFDM signal, and presuming a channel state such as attenuation or phase delay.

The optimal beam detecting unit 270 calculates an optimal beam formation parameter E for receiving a signal having a high receiving power value, a small receiving distortion value, and a small beam load value through the signals a1, b1, g1, h1, c1, d1, e1, f1 received from the receiving power measuring unit 210, the beam load measuring unit 230, and the receiving distortion calculating unit 250, and outputs the optimal beam formation parameter E to the receiving beam coefficient setup unit 290.

The receiving beam coefficient setup unit 290 calculates the beam coefficient F which is an antenna driving control value for forming a beam configuration corresponding to the optimal beam formation parameter E on the antennas 510, 550.

Figure 5:
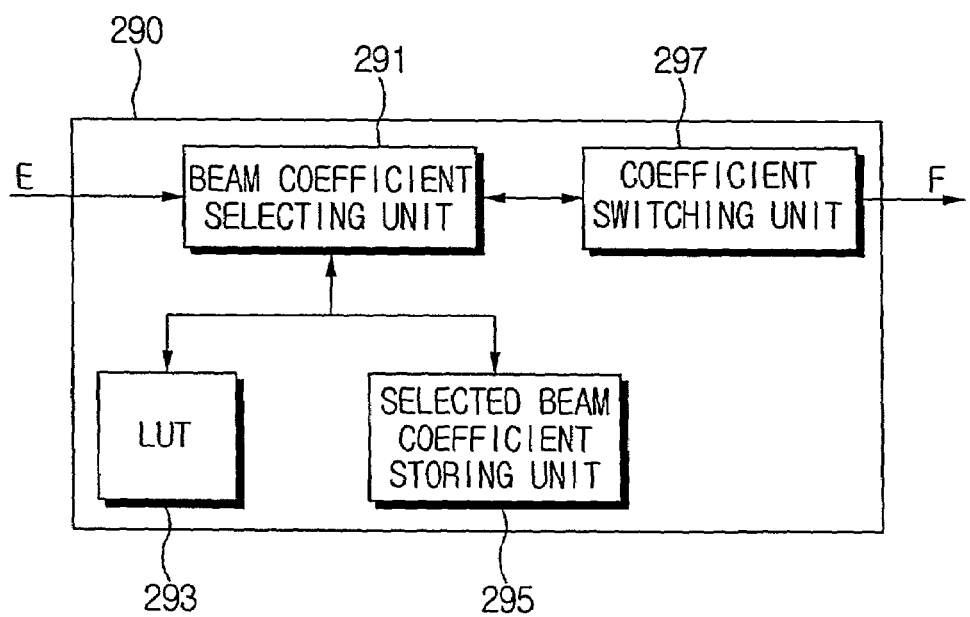
FIG. 5 is a block diagram illustrating a beam coefficient setup unit in FIG. 3.

FIG. 5 is a block diagram illustrating the receiving beam coefficient setup unit 290 in FIG. 3. As shown therein, the receiving beam coefficient setup unit 290 includes a beam coefficient selecting unit 291, a lookup table 293, a selected beam coefficient storing unit 295, and a coefficient switching unit 297.

The beam coefficient selecting unit 291 calculates the beam coefficient F which is an antenna driving control value for forming on the antennas a beam corresponding to the optimal beam formation parameter E from the optimal beam detecting unit 270.

Preferably, the beam coefficient F corresponding to the optimal beam parameter E detected in the optimal beam detecting unit 270 is selected through the lookup table 293 storing the corresponding information.

The beam coefficient calculating unit 290 includes the selected beam coefficient storing unit 295 for storing the beam coefficient F corresponding to the optimal beam parameter E calculated in the beam coefficient selecting unit 291. The beam coefficient F stored in the beam coefficient storing unit 295 is employed to form the beam on the antennas 510, 550 at a predetermined interval of time, or to calculate beam formation data information of the receiving signals S1, S2.

The coefficient switching unit 297 outputs the beam coefficient F calculated in the beam coefficient selecting unit 291, to the receiving beam processing unit 300.

Figure 6:
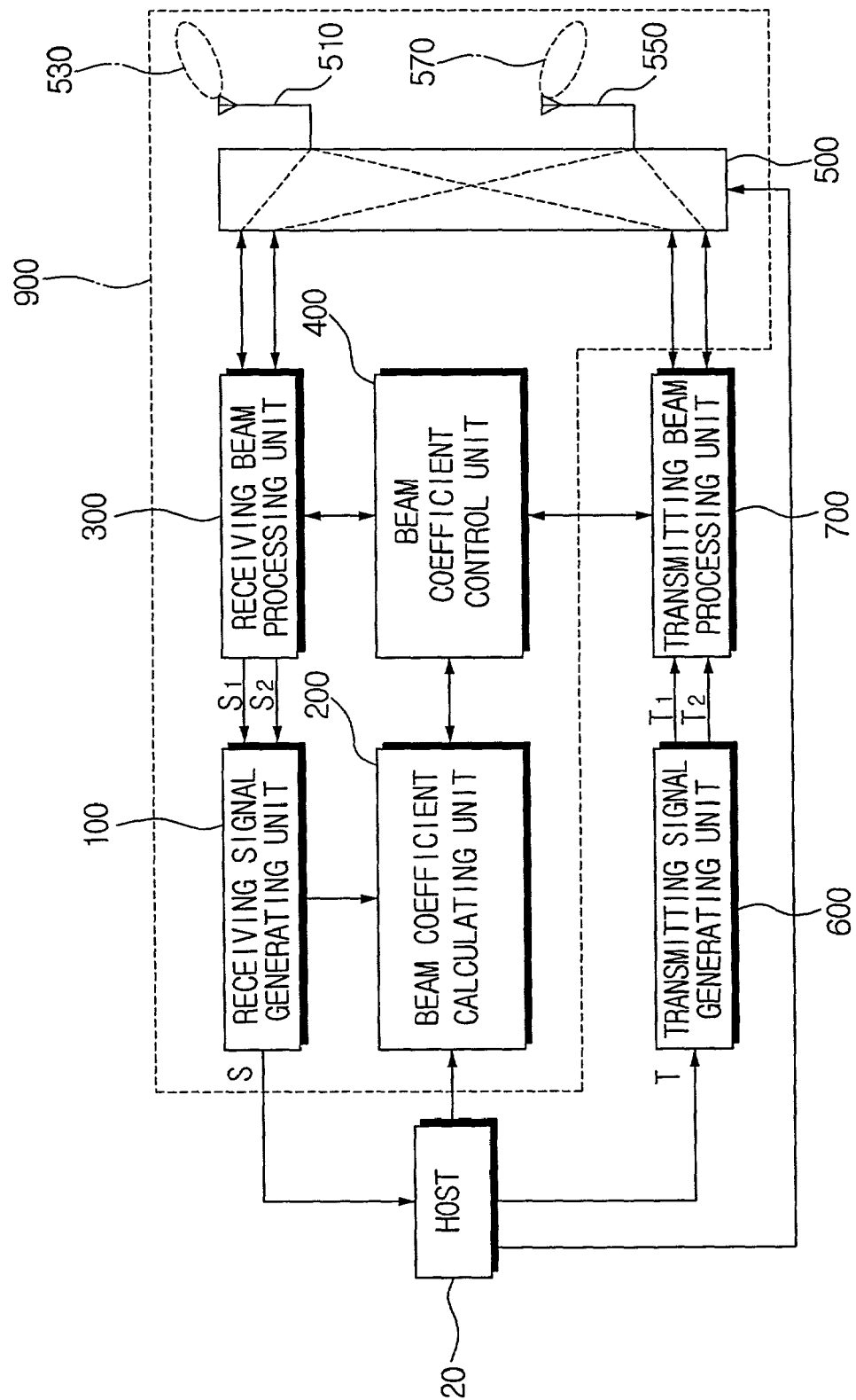
FIG. 6 is a block diagram illustrating a communication device using the OFDM receiving device in accordance with the present invention.

In addition, the OFDM communication device in accordance with the present invention will now be described with reference to FIG. 6. The identical units are provided with the same reference numerals. Therefore, constitutional units of a transmission mode after calculating the beam coefficient F of the receiving signal will now be explained. As depicted in FIG. 6, the OFDM communication device includes a receiving signal generating unit 100, a beam coefficient calculating unit 200, a receiving beam processing unit 300, a beam coefficient control unit 400, a plurality of antennas 510, 550, a signal switching unit 500, a transmitting signal generating unit 600, and a transmitting beam processing unit 700.

Reference numeral 20 denotes a host. The host 20 is a digital communication device for providing a digital multimedia service through OFDM signals. Exemplary hosts include a digital image communication device, a digital audio broadcasting device, and a digital frequency modulation communication device. In addition, the host 20 controls switching of the OFDM signal by judging transmission/reception of the signal, and outputs a transmission-intended signal T to the transmitting signal generating unit 600. The host 20 outputs the load information of the beam to the beam coefficient calculating unit 200 through a decoded signal of the signal from the receiving signal generating unit 100.

The transmitting signal generating unit 600 codes and modulates the signal T from the host 20 into the OFDM signal, and outputs the resultant signal to the transmitting beam processing unit 700.

Figure 7:
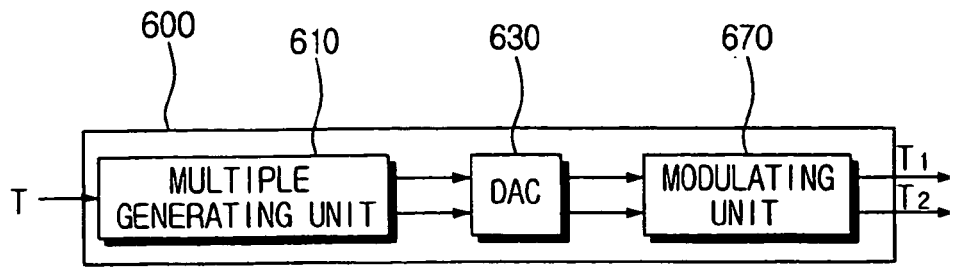
FIG. 7 is a block diagram illustrating a transmitting signal generating unit in FIG. 6.

FIG. 7 is a block diagram illustrating the transmitting signal generating unit 600 in FIG. 6. Referring to FIG. 7, the transmitting signal generating unit 600 includes a multiple generating unit 610, a digital-analog converting unit 630 and a modulating unit 670.

The multiple generating unit 610 converts the signal T from the host 20 into a plurality of identical signals, and outputs the resultant signals to the digital-analog converting unit 630. In this embodiment, the multiple generating unit 610 generates two identical output signals per one input signal.

The digital-analog converting unit 630 converts the two input signals into analog signals, and outputs the resultant signals to a modulating unit 670.

The modulating unit 670 outputs synthetic signals of the signals from the digital-analog converting unit 630 and a carrier, namely modulated waves T1, T2 to the transmitting beam processing unit 700.

The beam coefficient control unit 400 outputs to the receiving beam processing unit 300 the beam coefficient F calculated in the beam coefficient calculating unit 200 for forming the receiving beam through the antennas 510, 550 in the reception mode. In addition, the beam coefficient control unit 400 outputs to the transmitting beam processing unit 700 the beam coefficient F calculated in the beam coefficient calculating unit 200, in the reception mode for transmitting the transmission-intended signal.

In order to transmit the inputinput modulated waves T1, T2, the transmitting beam processing unit 700 controls the antennas 510, 550 to correspond to the beam according to the beam coefficient F from the coefficient control unit 400.

The host 20 outputs the calculated antenna driving control signal to the antennas 510, 550 through connection lines. The beam configurations 530, 570 corresponding to the output values are formed on the antennas 510, 550. The signals T1, T2 are transmitted to the air through the beam configurations 530, 570.

Figure 8:
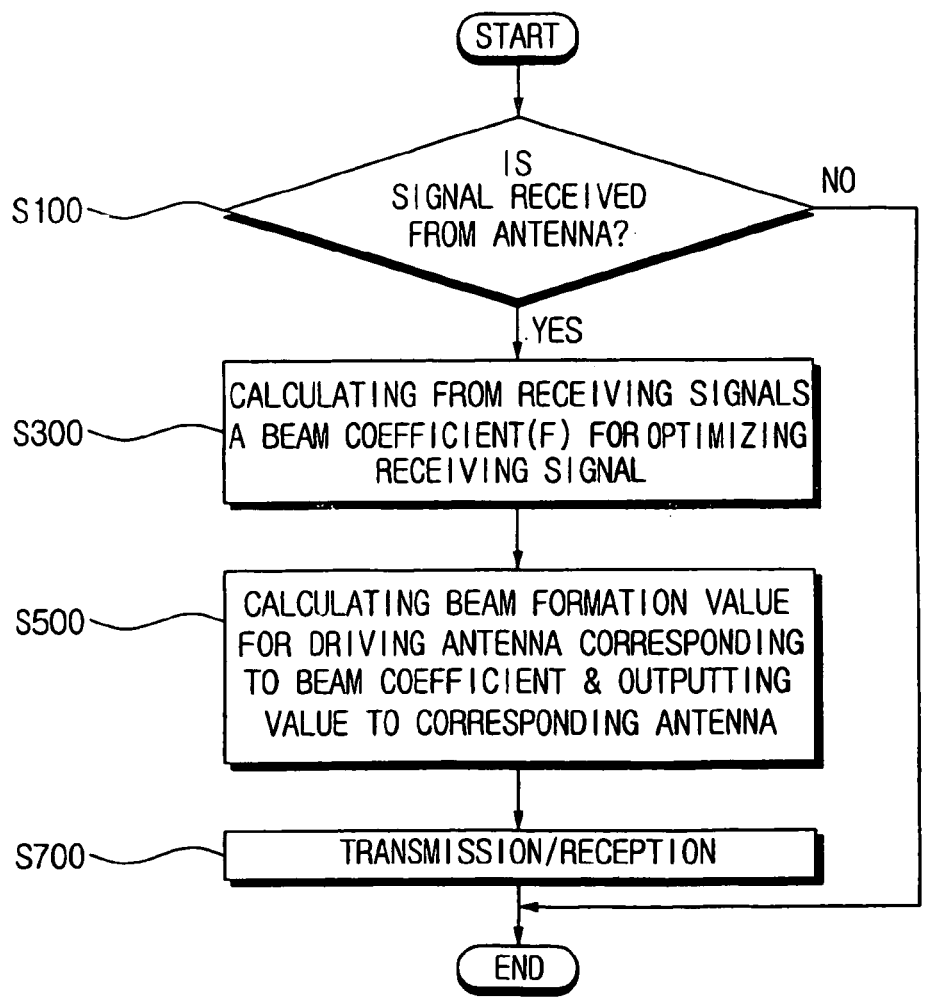
FIG. 8 is a flowchart showing an OFDM communication method in accordance with the present invention.

FIG. 8 is a flowchart showing the OFDM communication method in accordance with the present invention. As shown therein, the receiving beam processing unit 300 determines whether the signals S1, S2 are received from the respective antennas 510, 550 (S100).

As a result, when the signals S1, S2 are received from the antennas 510, 550, the beam coefficient F used to determine a beam direction for optimizing the receiving signal, is calculated from the respective signals S1, S2 (S300).

The beam formation value for driving the antenna corresponding to the calculated beam coefficient F is calculated and output to the corresponding antenna (S500).

The OFDM signal is received/transmitted by the beams 530, 570 formed on the antenna according to the beam formation value for driving the antenna (S700).

FIG. 9 is a flowchart showing the beam coefficient calculating process (S300) in FIG. 8. First, the beam coefficient calculating process (S300) determines whether the signals a, b amplified in the high frequency amplifying unit 150 are input (S310).

When the high frequency signals a, b are input in S310, the receiving power values a1, b1 are measured from the amplitudes of the high frequency signals a, b (S315). Here, the resultant values may also be used to calculate the optimal beam parameter E according to the beam load information g, h input to the host 20, and set up in the respective antennas 510, 550.

On the other hand, when the high frequency signals a, b are not received in S310, it is determined whether the low frequency signals c, d are input (S330). As a result, when the low frequency signals c, d are respectively input, the SNRs c1, d1 accompanying the signal power are calculated from the amplitudes of the low frequency signals c, d (S335).

When the low frequency signals c, d are not input in S330, it is determined whether the digital signals e, f are input (S350). When the digital signals e, f are input in S350, the BERs e1, f1 accompanying the whole bit number of the bit signals e, f are calculated (S355).

In S350, when the digital signals e, f are not input to the beam coefficient calculating unit 200, the beam coefficient calculating process is finished.

As described above, the optimal beam parameter E corresponding to the optimal receiving state is calculated by combining the receiving power a1, b1, beam load information g1, h1, SNRs c1, d1 and BERs e1, f1 (S370). Here, the optimal beam parameter E may be calculated by using at least one bit of information selected respectively from the information a1, b1, g1, h1, c1, d1, e1, f1.

The beam coefficient F, which is a driving control value of the antennas 510, 550, is calculated from the optimal beam parameter E (S390). Preferably, the beam coefficient F is stored (S410). The stored beam coefficient F may be used to form the beam having a time difference from the signal received through the antennas 510, 550, or to calculate statistical data of the antennas 510, 550 in the beam formation.

In the case that the OFDM communication is performed according to the above-described communication method, it is possible to accurately decode the receiving signal and select a transmission direction of the signal.

In this embodiment, two antennas 510, 550 are used. However, if three or more antennas are used to precisely set up the beam direction, accuracy of the signal transmission/reception can be remarkably improved.

Although a preferred embodiment of the present invention has been described, it is understood that the present invention should not be limited to this preferred embodiment, but various changes and modifications can be made by one skilled in the art within the spirit and scope of the present invention as hereinafter claimed.

What is claimed is:

1. An Orthogonal Frequency Division (OFDM) receiving device for forming a beam with uneven width according to a channel property, comprising:
   a receiving signal generating unit for decoding and restoring OFDM signals from a plurality of antennas;
   a beam coefficient calculating unit for calculating channel property information inclusive of a signal to noise ratio, from signals received from the receiving signal generating unit, and calculating a beam coefficient for one of the plurality of antennas for forming a beam in a configuration that optimizes reception sensitivity from the channel property information; and
   a receiving beam processing unit for outputting the OFDM signals from the plurality of antennas to the receiving signal generating unit, and controlling a corresponding one of the plurality of antennas to form a beam in a configuration corresponding to the beam coefficient received from the beam coefficient calculating unit.

2. The device according to claim 1, wherein the receiving signal generating unit is connected to a host for processing the decoded signals.

3. An Orthogonal Frequency Division (OFDM) receiving device for forming a beam with uneven width according to a channel property, comprising:
   a receiving signal generating unit for decoding and restoring OFDM signals from a plurality of antennas;
   a beam coefficient calculating unit for calculating channel property information inclusive of a signal to noise ratio, from signals received from the receiving signal generating unit, and calculating a beam coefficient for one of the plurality of antennas for forming a beam in a configuration that optimizes reception sensitivity from the channel property information; and
   a receiving beam processing unit for outputting the OFDM signals from the plurality of antennas to the receiving signal generating unit, and controlling a corresponding one of the plurality of antennas to form a beam in a configuration corresponding to the beam coefficient received from the beam coefficient calculating unit;
   wherein the receiving signal generating unit is connected to a host for processing the decoded signals;

wherein the receiving signal generating unit comprises:
a high frequency amplifying unit for high-frequency amplifying the signals output from the receiving beam processing unit and received from the plurality of antennas;
a low frequency amplifying unit for detecting original signals from the high-frequency amplified signals, and low-frequency amplifying the detected signals;
an analog-digital converting unit for converting the low-frequency amplified analog signals into digital signals; and
a receiving signal decoding unit for selecting a signal having high reception sensitivity to the original signals from the digital signals, and outputting the selected signal to the host.

4. The device according to claim 3, wherein the signal to noise ratio is obtained by calculating an original signal to noise ratio of respective OFDM signals based on the low-frequency amplified signal from the low frequency amplifying unit.

5. The device according to claim 4, wherein the channel property information comprises bit to error ratios of the respective OFDM signals showing an error bit number of a whole bit number of the digital signals from the analog-digital converting unit.

6. The device according to claim 5, wherein the channel property information further comprises beam load information of each of the plurality of antennas, showing an amount of the received information of beams formed on the plurality of antennas through the decoded signals of the received OFDM signals.

7. The device according to claim 6, wherein the channel property information further comprises receiving power values of the respective OFDM signals calculated by measuring power of the OFDM signals received from the high frequency amplifying unit based on their amplitudes.

8. The device according to claim 7, wherein the beam coefficient calculating unit comprises:
a receiving power measuring unit for measuring a receiving power corresponding to amplitudes of the OFDM signals from the high frequency amplifying unit;
a beam load measuring unit for measuring signal reception density according to reception of the plurality of antennas through the decoded signals of the OFDM signals received from the receiving signal generating unit;
a receiving distortion calculating unit for calculating a distortion noise ratio from the signals received from the low frequency amplifying unit, and a distortion signal rate from the bit signals received from the analog-digital converting unit;
an optimal beam detecting unit for detecting an optimal beam parameter for receiving the OFDM signals from the receiving power values, beam load information, and receiving distortion values; and
a receiving beam coefficient setup unit for calculating a beam coefficient for forming the beam corresponding to the optimal beam parameter on one of the plurality of antennas.

9. The device according to claim 8, wherein the receiving distortion calculating unit comprises:
a signal to noise ratio calculating unit for calculating a signal to noise ratio accompanying the signal power from the amplitudes of the low-frequency amplified signals from the low frequency amplifying unit; and
a bit to error ratio calculating unit for detecting an error bit number from the whole bit number of the digital signals received from the analog-digital converting unit, and calculating a bit to error ratio for the whole bit number.

10. The device according to claim 9, wherein the receiving beam coefficient setup unit comprises:
a beam coefficient selecting unit for calculating a beam coefficient corresponding to the optimal beam parameter from the optimal beam detecting unit to form a beam corresponding to the optimal beam parameter; and
a coefficient switching unit for switching the beam coefficient to the receiving beam processing unit according to a switching control signal.

11. The device according to claim 10, wherein the receiving beam coefficient setup unit further comprises a lookup table for storing beam coefficient information for forming a width of the beam corresponding to the optimal beam parameter.

12. The device according to claim 11, wherein the receiving beam coefficient setup unit further comprises a selected beam coefficient storing unit for storing the beam coefficient selected by the beam coefficient selecting unit.

13. An Orthogonal Frequency Division Multiplexing (OFDM) communication device for forming a beam with uneven width according to a channel property, comprising:
a receiving signal generating unit for decoding and restoring OFDM signals from a plurality of antennas;
a beam coefficient calculating unit for calculating channel property information inclusive of a signal to noise ratio, from signals received from the receiving signal generating unit, and calculating a beam coefficient for one of the plurality of antennas for forming a beam in a configuration that optimizes reception sensitivity, from the channel property information;
a receiving beam processing unit for outputting the OFDM signals from the plurality of antennas to the receiving signal generating unit, and controlling a corresponding one of the plurality of antennas to form a beam in a configuration corresponding to the beam coefficient calculated by the beam coefficient calculating unit;
a transmitting signal generating unit for modulating a transmission-intended signal into a transmitting signal; and
a transmission beam processing unit for controlling said one of the plurality of antennas according to the beam coefficient calculated by the beam coefficient calculating unit in order to transmit the transmitting signal through said one of the plurality of antennas.

14. The device according to claim 13, further comprising:
a beam coefficient control unit for controlling the beam coefficient calculated by the beam coefficient calculating unit to be output to the receiving beam processing unit or the transmitting beam processing unit, wherein the receiving signal generating unit and the transmitting signal generating unit are connected to a host for processing an external decoded signal or transmitting the transmission-intended signal.

15. The device according to claim 14, further comprising a signal switching unit for switching a signal to the receiving beam processing unit according to a signal switching signal from the host when the signal is input through said one of the plurality of antennas, and for switching the transmission-intended signal to said one of the antennas according to the signal switching signal from the host when the signal is output to said one of the plurality of antennas.

16. An Orthogonal Frequency Division Multiplexing (OFDM) communication method for forming a beam with uneven width according to a channel property, comprising the steps of:

determining whether at least one of a plurality of signals is received from at least one of a plurality of antennas;

calculating channel property information from said at least one of the plurality of signals, and calculating a beam coefficient corresponding to an antenna beam configuration for improving communication performance, from the channel property information, when said at least one of the plurality of signals is received from at least one of the plurality of antennas; and adjusting a beam formation azimuth of said at least one of the plurality of antennas to form a beam corresponding to the calculated beam coefficient.

17. The method according to claim 16, wherein the channel property information comprises at least one of the signal to noise ratios, bit to error ratios, beam load information, and receiving power values of each of the plurality of received signals.

18. An Orthogonal Frequency Division Multiplexing (OFDM) communication method for forming a beam with uneven width according to a channel property, comprising the steps of:

determining whether at least one of a plurality of signals is received from at least one of a plurality of antennas;

calculating channel property information from said at least one of the plurality of signals, and calculating a beam coefficient corresponding to an antenna beam configuration for improving communication performance, from the channel property information, when said at least one of the plurality of signals is received from at least one of the plurality of antennas; and adjusting a beam formation azimuth of said at least one of the plurality of antennas to form a beam corresponding to the calculated beam coefficient;

wherein the channel property information comprises at least one of the signal to noise ratios, bit to error ratios, beam load information, and receiving power values of each of the plurality of received signals;

wherein the beam coefficient calculating process comprises the steps of:

measuring a receiving power from a high-frequency amplified signal of said at least one of the plurality of signals, calculating a signal to noise ratio from a low-frequency amplified signal thereof, and calculating a bit to error ratio accompanying a whole bit number of a digital signal;

detecting an optimal beam parameter of said at least one of the plurality of signals having a high receiving power, low signal to noise ratio, and low bit to error ratio, from the measured receiving power, signal to noise ratio, and bit to error ratio; and calculating a beam coefficient corresponding to the optimal beam parameter.

* * * * *